(12) United States Patent
Shi et al.

(10) Patent No.: US 11,641,662 B2
(45) Date of Patent: May 2, 2023

(54) CHANNEL TRANSMISSION METHOD, TERMINAL, NETWORK DEVICE, AND NON-TRANSITORY COMPUTER READABLE STORAGE MEDIUM

(71) Applicant: VIVO MOBILE COMMUNICATION CO., LTD., Guangdong (CN)

(72) Inventors: Yuan Shi, Chang'an Dongguan (CN); Peng Sun, Chang'an Dongguan (CN); Yu Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/716,893

(22) Filed: Apr. 8, 2022

(65) Prior Publication Data

US 2022/0232571 A1 Jul. 21, 2022

Related U.S. Application Data

(63) Continuation of application No. 17/039,693, filed on Sep. 30, 2020, now Pat. No. 11,337,221, which is a (Continued)

(30) Foreign Application Priority Data

Apr. 4, 2018 (CN) .......................... 201810302205.3

(51) Int. Cl.
*H04W 72/04* (2023.01)
*H04W 76/27* (2018.01)
(Continued)

(52) U.S. Cl.
CPC ..... *H04W 72/0493* (2013.01); *H04W 56/001* (2013.01); *H04W 72/042* (2013.01);
(Continued)

(58) Field of Classification Search
CPC ........... H04W 72/0493; H04W 56/001; H04W 72/042; H04W 72/0446; H04W 72/0453;
(Continued)

(56) References Cited

U.S. PATENT DOCUMENTS

| 2018/0062807 | A1 | 3/2018 | Seo et al. |
| 2021/0007066 | A1* | 1/2021 | Lin .................. H04L 5/005 |
| 2022/0046541 | A1* | 2/2022 | Wu .................. H04W 52/0232 |

FOREIGN PATENT DOCUMENTS

| CN | 103945447 A | 7/2014 |
| CN | 107659994 A | 2/2018 |
| WO | 2018030864 A1 | 2/2018 |

OTHER PUBLICATIONS

"3rd Generation Partnership Project; Technical Specification Group Radio Access Network; NR; Physical layer procedures for control (Release 15)" 3GPP TS 38.213 V.15.0.0, Dec. 2017.
(Continued)

*Primary Examiner* — Kyaw Z Soe
(74) *Attorney, Agent, or Firm* — Maschoff Brennan

(57) ABSTRACT

A channel transmission method, a terminal, a network device, and a non-transitory computer readable storage medium are disclosed. The non-transitory computer readable storage medium stores therein a computer program, wherein the computer program is used to be executed by a processor to implement steps of: acquiring target transmission configuration indicator (TCI) state information of a control resource set with an identity value of 0 (CORESET0); receiving a physical downlink channel according to the target TCI state information when a preset condition is met; wherein the physical downlink channel includes at least one of: a physical downlink control channel (PDCCH) and a physical downlink shared channel (PDSCH).

20 Claims, 3 Drawing Sheets

Acquiring target transmission configuration indicator TCI state information of a control resource set with an identity value of 0 (CORESET0) — 11

Receiving a physical downlink channel according to the target TCI state information when a preset condition is met — 12

Related U.S. Application Data continuation of application No. PCT/CN2019/080997, filed on Apr. 2, 2019.

(51) Int. Cl.
*H04W 56/00* (2009.01)
*H04W 80/02* (2009.01)
*H04W 72/0446* (2023.01)
*H04W 72/0453* (2023.01)

(52) U.S. Cl.
CPC ... *H04W 72/0446* (2013.01); *H04W 72/0453* (2013.01); *H04W 76/27* (2018.02); *H04W 80/02* (2013.01)

(58) Field of Classification Search
CPC .... H04W 76/27; H04W 80/02; H04L 5/0053; H04L 5/0091; H04L 5/0044; H04B 17/373
See application file for complete search history.

(56) References Cited

OTHER PUBLICATIONS

CN Office Action in Application No. 201810302205.3 dated Apr. 25, 2021.
European Search Report in Application No. 19781038.5 dated Apr. 29, 2021.
JP Office Action in Application No. 2020-554152 dated Jan. 4, 2022.
"On beam indication, measurement, and reporting" 3GPP TSG-RAN WG1 #90bis, Ericsson, R1-1718433, Oct. 9, 2017.
"Details and evaluation results on beam indication" 3GPP TSG RAN WG1 Meeting #91, ZTE, Sanechips, R1-1719538, Nov. 27, 2017.
"Remaining issues on beam measurement and reporting" 3GPP TSG RAN WG1 Meeting #92, vivo, R1-1801520, Feb. 26, 2018.
"Feature lead summary 1 on beam measurement and reporting" 3GPP TSG RAN WG1 Meeting #92, Ericsson, R1-1803260, Feb. 26, 2018.
"Feature lead summary 4 on beam measurement and reporting" 3GPP TSG RAN WG1 Meeting #92, Ericsson, R1-1803481, Feb. 26, 2018.

* cited by examiner

CHANNEL TRANSMISSION METHOD, TERMINAL, NETWORK DEVICE, AND NON-TRANSITORY COMPUTER READABLE STORAGE MEDIUM

CROSS-REFERENCE TO RELATED APPLICATION

The present application is a continuation of U.S. patent application Ser. No. 17/039,693 filed on Sep. 30, 2020, which is a continuation of PCT Application No. PCT/CN2019/080997 filed on Apr. 2, 2019, which claims a priority to the Chinese patent application No. 201810302205.3 filed in China on Apr. 4, 2018, the contents of which are incorporated herein by reference in their entireties.

TECHNICAL FIELD

The present disclosure relates to the field of communications technologies, in particular to a channel transmission method, a terminal, a network device, and a non-transitory computer readable storage medium.

BACKGROUND

In mobile communication systems, for a physical downlink control channel (Physical Downlink Control Channel, PDCCH), a terminal may receive a PDCCH common search space and various parameters configured by a network device, wherein a transmission control indicator (Transmission Control Indicator, TCI) state parameter includes a plurality of TCI states for the PDCCH. Before the network device activates one of the TCI states through a medium access control (Medium Access Control, MAC) control element (Control Element, CE), the terminal assumes that a de-modulation reference signal (De-Modulation Reference Signal, DMRS) port of the PDCCH is quasi co-located (Quasi Co-Located, QCL) with a synchronization signal and physical broadcast channel (Physical Broadcast Channel, PBCH) block (Synchronization Signal and PBCH Block, SSB) configured in an initial access procedure. Correspondingly, for a physical downlink shared channel (Physical Downlink Shared Channel, PDSCH), before the terminal receives a TCI configured by a higher layer and activation information, the terminal assumes that a DMRS port of the PDSCH is QCL with an SSB configured in an initial access procedure. Since the TCI of the SSB configured in the initial access procedure is pre-configured and remains fixed, before a certain TCI state is activated for the PDCCH or PDSCH, the terminal considers that the DMRS port of the PDCCH or PDSCH is QCL with the SSB. Consequently, the terminal cannot operate flexibly according to network performance, leading to deterioration of system performance.

SUMMARY

Embodiments of the present disclosure provide a channel transmission method, a terminal, a network device, and a non-transitory computer readable storage medium, to solve the problem that the DMRS port of the PDCCH or PDSCH is QCL with the SSB, thus the terminal cannot operate flexibly according to network performance, leading to deterioration of system performance.

In a first aspect, an embodiment of the present disclosure provides a channel transmission method. The method is operable by a terminal side and includes: acquiring target transmission configuration indicator (TCI) state information of a control resource set with an identity value of 0 (CORESET0); receiving a physical downlink channel according to the target TCI state information when a preset condition is met; wherein the physical downlink channel includes at least one of: a physical downlink control channel (PDCCH) and a physical downlink shared channel (PDSCH).

In a second aspect, an embodiment of the present disclosure further provides a terminal. The terminal includes: a first acquisition module, used to acquire target transmission configuration indicator (TCI) state information of a control resource set with an identity value of 0 (CORESET0); a first reception module, used to receive a physical downlink channel according to the target TCI state information when a preset condition is met; wherein the physical downlink channel includes at least one of: a physical downlink control channel (PDCCH) and a physical downlink shared channel (PDSCH).

In a third aspect, an embodiment of the present disclosure provides a terminal including a processor, a memory and a computer program stored in the memory and used to be executed by the processor, wherein the processor is used to execute the computer program to implement steps of the foregoing channel transmission method.

In a fourth aspect, an embodiment of the present disclosure provides a channel transmission method. The method is operable by a network device side and includes: configuring target transmission configuration indicator (TCI) state information for a control resource set with an identity value of 0 (CORESET0); transmitting a physical downlink channel according to the target TCI state information when a preset condition is met; wherein the physical downlink channel includes at least one of: a physical downlink control channel (PDCCH) and a physical downlink shared channel (PDSCH).

In a fifth aspect, an embodiment of the present disclosure provides a network device. The network device includes: a configuration module, used to configure target transmission configuration indicator (TCI) state information for a control resource set with an identity value of 0 (CORESET0); a first transmission module, used to transmit a physical downlink channel according to the target TCI state information when a preset condition is met; wherein the physical downlink channel includes at least one of: a physical downlink control channel (PDCCH) and a physical downlink shared channel (PDSCH).

In a sixth aspect, an embodiment of the present disclosure further provides a network device including a processor, a memory and a computer program stored in the memory and used to be executed by the processor, wherein the processor is used to execute the computer program to implement steps of the foregoing channel transmission method.

In a seventh aspect, an embodiment of the present disclosure provides a non-transitory computer readable storage medium storing therein a computer program, wherein the computer program is used to be executed by a processor to implement steps of the foregoing channel transmission method.

Thus, a network device and a terminal according to embodiments of the present disclosure may perform physical downlink channel transmission according to TCI state information of the CORESET0 when a preset condition is met. As a result, the flexibility of physical downlink channel transmission may be improved, thereby improving system performance.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person of ordinary skill in the art can obtain other drawings based on the described drawings without any creative effort.

DETAILED DESCRIPTION

Hereinafter, the exemplary embodiments of the present disclosure are described in detail with reference to the accompanying drawings. Although the exemplary embodiments of the present disclosure are illustrated in the accompanying drawings, the disclosure may, however, be embodied in many different forms and should not be construed as being limited to the embodiments set forth herein. Rather, these embodiments are provided so that the present disclosure will be thoroughly understood, and will fully convey the scope of the present disclosure to a person skilled in the art.

Terms "first", "second" and the like in the specification and claims of the present disclosure are adopted not to describe a specific sequence or order but to distinguish similar objects. It should be understood that data used like this may be interchanged under a proper condition for implementation of the embodiments of the disclosure described here in a sequence apart from those shown or described here. In addition, terms "include" and "have" and any variant thereof are intended to cover nonexclusive inclusions. For example, a process, method, system, product or equipment including a series of steps or units is not limited to those steps or units clearly listed, but may include other steps or units which are not clearly listed or intrinsic to the process, the method, the product or the equipment.

Figure 1:
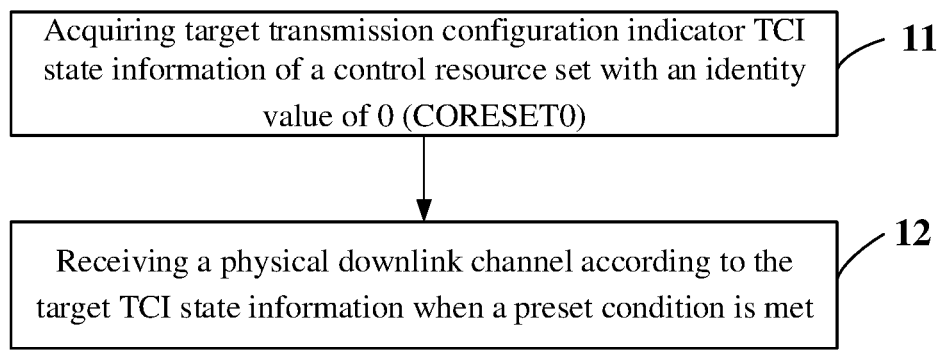
FIG. 1 is a schematic flow diagram of a channel transmission method on a terminal side according to an embodiment of the present disclosure.

An embodiment of the present disclosure provides a channel transmission method. The method is operable by a terminal, and as shown in FIG. 1, includes the following steps.

A step 11: acquiring target transmission configuration indicator (TCI) state information of a control resource set with an identity value of 0 (CORESET0).

The identity value may be an Id value or index value of a CORESET. The CORESET0 may be configured according to master system information block (Master System Information Block, MIB) information carried in an SSB and Serving Cell Config Common information. In specific, the MIB includes 8 bits; one of pre-defined tables each including 16 index values (0-15) is selected according to sub-carrier spacing of the SSB and sub-carrier spacing of the CORESET0, and one of the index values 0-15 is selected through 4 bits in the 8 bits. The different index values each correspond to information such as a frequency domain length of the CORESET, a frequency domain position of the CORESET relative to the SSB, and a time domain length of the CORESET. In other words, the 4 bits also indicate information such as a frequency domain length of the CORESET, a frequency domain position of the CORESET relative to the SSB, and a time domain length of the CORESET.

Further, according to a multiplexing parameter, frequency range 1 (Frequency Range 1, FR1), frequency range 2 (Frequency Range 2, FR2), and sub-carrier spacing (Sub-Carrier Spacing, SCS) corresponding to the index value indicated by the 4 bits, the sub-carrier spacing of the CORESET0, etc., one of other pre-defined tables is selected, wherein each table may include 16 index values (0-15) as well. One of the 16 index values is selected through remaining 4 bits, whereby the position of the first time domain symbol of the CORESET and other information may be determined.

A step 12: receiving a physical downlink channel according to the target TCI state information when a preset condition is met.

The physical downlink channel includes at least one of: a physical downlink control channel (PDCCH) and a physical downlink shared channel (PDSCH). Taking a PDCCH for example, 4 different types of PDCCH search spaces are defined in the system as follows.

1. Type0-PDCCH common search space: this type of search space is defined for a PDCCH corresponding to remaining minimum system information (Remaining Minimum System Information, RMSI). A downlink control information (Downlink Control Information, DCI) format carried in a PDCCH detected in this type of search space carries cyclic redundancy check (Cyclic Redundancy Check, CRC) scrambled by a system information radio network temporary identity (System Information Radio Network Temporary Identity, SI-RNTI) corresponding to a primary cell (Primary Cell, Pcell).

2. Type0A-PDCCH common search space: this type of search space is defined for a PDCCH corresponding to other system information (Other System Information, OSI). A DCI format carried in a PDCCH detected in this type of search space carries CRC scrambled by an SI-RNTI corresponding to a primary cell (Pcell).

3. Type1-PDCCH common search space: this type of search space is defined for an ordinary PDCCH (or referred to as regular PDCCH). A DCI format carried in a PDCCH detected in this type of search space carries CRC scrambled by a random access radio network temporary identity (Random Access Radio Network Temporary Identity, RA-RNTI), temporary cell radio network temporary identity (Temporary Cell Radio Network Temporary Identity, TC-RNTI) or cell radio network temporary identity (Cell Radio Network Temporary Identity, C-RNTI) corresponding to a primary cell (Pcell).

4. Type2-PDCCH common search space: A DCI format carried in a PDCCH detected in this type of search space carries CRC scrambled by a paging radio network temporary identity (Paging Radio Network Temporary Identity, P-RNTI) corresponding to a primary cell (Pcell).

It is noted, the PDCCH in the physical downlink channel received according to the TCI state information of the CORESET0 may be a PDCCH corresponding to the Type1-PDCCH common search space.

The step 12 may include: determining that the physical downlink channel is quasi co-located (QCL) with the CORESET0 when the preset condition is met; receiving the physical downlink channel according to the target TCI state information when the physical downlink channel is QCL with the CORESET0. When the preset condition is met, it is determined that the physical downlink channel is quasi co-located (QCL) with the CORESET0. Here, the quasi co-location relationship between the physical downlink channel and the CORESET0 may also be referred to as a default quasi co-location relationship. The preset condition refers to a condition satisfying the default quasi co-location relationship, and the preset condition may be pre-defined, or may be configured by a network device.

Preferably, the preset condition may include at least one of following conditions.

A condition that it is pre-defined that the physical downlink channel is QCL with the CORESET0. That is, it is pre-defined that there is a QCL relationship between the physical downlink channel and the CORESET0. For example, the terminal may assume that the DMRS port for the PDCCH in the Type1-PDCCH common search space and the PDSCH indicated by the PDCCH are QCL with the CORESET0.

Another condition: configuration information of at least two TCI states corresponding to the physical downlink channel is received, and activation information for the at least two TCI states is not received. For example, the terminal receives from the higher layer a CORESET configuration which carries information of more than one (i.e., two or more) TCI states, and before one of the TCI states is activated by an MAC CE, the terminal assumes that, during the reception of a PDCCH in the CORESET, there is a QCL relationship between the DMRS port for the PDCCH and the CORESET0. Alternatively, the terminal assumes that, during the reception of a PDSCH in the CORESET, there is a QCL relationship between the DMRS port for the PDSCH and the CORESET0. It is noted, for a PDCCH, when a terminal receives configuration information indicating the only one TCI state corresponding to the PDCCH, if no activation information for the TCI state is received, the TCI state may be directly used in the PDCCH reception without using the default QCL relationship. For a PDSCH, when a terminal receives configuration information indicating the only one TCI state corresponding to the PDSCH, if no activation information for the TCI state is received, the PDSCH reception can be performed only through the TCI state of the CORESET0 by using the default QCL relationship.

Further, configuration information of at least two TCI states corresponding to the physical downlink channel is received, and activation information for the at least two TCI states is not received includes one of following scenarios.

A first scenario: configuration information of at least two TCI states configured for the physical downlink channel for a first time is received, and activation information for the at least two TCI states is not received. Taking a PDSCH for example, after the terminal receives TCI state configuration information from the higher layer for a first time, and before the terminal receives an MAC CE for activating multiple corresponding TCI states, the terminal assumes that an antenna port within one DMRS port group for a PDSCH in a serving cell is QCL with the CORESET0. For a PDCCH, a similar approach may be adopted, thus a detailed description thereof is omitted. Further, it is noted, for a PDSCH, after a terminal receives TCI state configuration information, which indicating the only one TCI state corresponding to the PDSCH, from the higher layer for a first time, if no activation information for the TCI state is received, the terminal may also assume that an antenna port within one DMRS port group for a PDSCH in a serving cell is QCL with the CORESET0.

A second scenario: configuration information of at least two TCI states re-configured for the physical downlink channel is received, and activation information for the at least two TCI states is not received. Taking a PDSCH for example, after the terminal receives TCI state configuration information re-configured by the higher layer, and before the terminal receives an MAC CE for activating multiple corresponding TCI states, the terminal assumes that an antenna port within one DMRS port group for a PDSCH in a serving cell is QCL with the CORESET0. For a PDCCH, a similar approach may be adopted, thus a detailed description thereof is omitted. Further, it is noted, for a PDSCH, after a terminal receives TCI state configuration information, which indicating the only one TCI state corresponding to the PDSCH, re-configured by the higher layer, if no activation information for the TCI state is received, the terminal may also assume that an antenna port within one DMRS port group for a PDSCH in a serving cell is QCL with the CORESET0.

In another embodiment, when the terminal receives the configuration information of the at least two TCI states re-configured for the physical downlink channel, and does not receive the activation information for the at least two TCI states, the terminal receives the physical downlink channel according to a last activated TCI state. Taking a PDSCH for example, after the terminal receives TCI state configuration information re-configured by the higher layer, and before the terminal receives an MAC CE for activating multiple corresponding TCI states, the terminal directly uses a TCI state activated (valid) before the re-configuration.

The above describes how to determine a default quasi co-location relationship between a physical downlink channel and the CORESET0. How to determine TCI state information of the CORESET0 is further described hereinafter. Optionally, the step 11 includes, but is not limited to the following manners.

The first manner: acquiring the target TCI state information of the CORESET0 through radio resource control (RRC) signaling other than that transmitting a master system information block (MIB); wherein the RRC signaling includes: a first parameter field indicating the identity value of the CORESET0, and a second parameter field indicating a TCI state corresponding to the CORESET0.

This manner lies in that the system allows the network device to configure the TCI state of the CORESET0 and indicate the configured TCI state to the terminal through RRC signaling other than MIB information after the initial access. Specifically, after the initial access, the network device indicates the TCI state information of the CORESET0 to the terminal through RRC signaling other than the MIB information. Preferably, a configuration method may include: configuring the TCI state information of the CORESET0 through a rule of limiting parameter in the higher layer signaling parameter CORESET field.

The rule of limiting parameter may include one of following rules.

A first rule: in a higher layer signaling parameter Control Resource Set field, when control Resource SetId has a value of 0 (i.e., the first parameter field indicates that the identity value of CORESET is 0), only the second parameter field (e.g., tci-States PDCCH field) is valid, and configuration of other parameter field is skipped or the other parameter field is invalid. A reference signal of the TCI state indicated by the second parameter field is a synchronization signal and PBCH block (SSB), wherein when the second parameter field indicates at least two TCI states, SSBs corresponding to different TCI states have different index numbers. In other words, when control Resource SetId has a value of 0, the reference signal in the indicated TCI states is SSB only, i.e., there is only a QCL relationship between the CORESET0 and SSB, and multiple TCI states differ from each other only in SSB index; accordingly, the terminal monitors SSB according to the index of the SSB in the received and activated TCI state, and monitors the PDCCH search space of the CORESET0 corresponding to the SSB to receive a PDCCH.

A second rule: in a higher layer signaling parameter Control Resource Set field, when control Resource SetId has a value of 0, not only the second parameter field is valid, but also other parameter field may be valid, but it should be limited that that configuration information indicated by the other parameter field is completely same as the configuration information in the MIB; in other words, the RRC signaling further includes: other parameter field used for indicating other parameter of the CORESET0, and the other parameter indicated by the other parameter field is the same as a parameter indicated by the MIB for the CORESET0.

With the foregoing rules, particularly the first rule, when the second parameter field indicates at least two TCI states, the acquiring, by the terminal, the target TCI state information of the CORESET0 through the radio resource control (RRC) signaling other than that transmitting the master system information block (MIB) may include: detecting the RRC signaling other than the RRC signaling transmitting the MIB; determining the target TCI state information of the CORESET0 according to the first parameter field and the second parameter field; and ignoring the other parameter field in the RRC signaling.

Further, when the second parameter field indicates at least two TCI states, the acquiring, by the terminal, the target TCI state information of the CORESET0 through the RRC signaling other than that transmitting the MIB may include: receiving, through the RRC signaling other than that transmitting the MIB, information of at least two TCI states of the CORESET0, receiving, through an MAC CE, activation information used for activating a TCI state of the CORESET0; determining the target TCI state information from the at least two TCI states according to the activation information. In other words, when the tci-States PDCCH field includes multiple values, activation is performed according to the normal rule of activating TCI state through a MAC CE.

The second manner: calculating, according to a received synchronization signal and PBCH block (SSB), a reception quality of the SSB; when the reception quality of the SSB is better than a reception quality of a target SSB corresponding to the CORESET0, determining that a CORESET corresponding to the SSB is a new CORESET0; acquiring the target TCI state information of the new CORESET0.

In this manner, the system allows the terminal to switch SSB index autonomously, and monitor the PDCCH common search space of corresponding CORESET0. Here, the SSB may be an SSB of a serving cell, or an SSB of a target cell in a cell handover process. Hereinafter, the second manner is further explained in connection with a serving cell SSB or a target cell SSB in the embodiment.

Taking a serving cell for example, the system may not allow a serving cell to configure the TCI state information of the CORESET0, and not allow a UE-specific search space to be associated with the CORESET0, that is, there is no dedicated information available in the CORESET0 for informing the terminal, and the terminal can only be informed through broadcast information. Further, after the initial access, the system allows the terminal to autonomously switch to form a QCL relationship between the CORESET0 and an SSB with high signal quality according to the quality of received SSB signal. That is, the terminal calculates, according to a received SSB, a signal quality of the SSB; if it is monitored that the reference signal received power (Reference Signal Received Power, RSRP) of current SSB signal is greater than an RSRP of an SSB signal corresponding to the monitored CORESET0, the terminal may switch to the SSB with relatively higher signal quality autonomously, and monitor the CORESET0 corresponding to the SSB. Having switched to the new CORESET0, the terminal receives a physical downlink channel according to the TCI state information of the new CORESET0.

Taking cell handover for example, the system does not allow a target cell to configure the TCI information of the CORESET0, and not allow a UE-specific search space to be associated with the CORESET0. During a cell handover, the system allows the terminal to autonomously switch, according to the quality of received SSB signal, to form a QCL relationship between the CORESET0 and an SSB with high signal quality in the SSB set of the target cell. That is, the terminal calculates the SSB signal quality of the received SSB in the SSB set of the target cell according to the received SSB. If it is monitored that the RSRP of current SSB signal is higher than the RSRP of the SSB to which the monitored CORESET0 corresponds, the terminal switches to an SSB with relatively higher signal quality autonomously and monitors the CORESET0 corresponding to the SSB. Having switched to the new CORESET0, the terminal receives a physical downlink channel according to the TCI state information of the new CORESET0.

In the channel transmission method according to the embodiments of the present disclosure, a network device and a terminal may perform physical downlink channel transmission according to TCI state information of the CORESET0 when a preset condition is met. Thus, the flexibility of physical downlink channel transmission may be improved, thereby improving system performance.

The foregoing embodiments describe a channel transmission method in different scenarios. The terminal corresponding to the method is further described hereinafter with reference to the accompany drawings.

Figure 2:
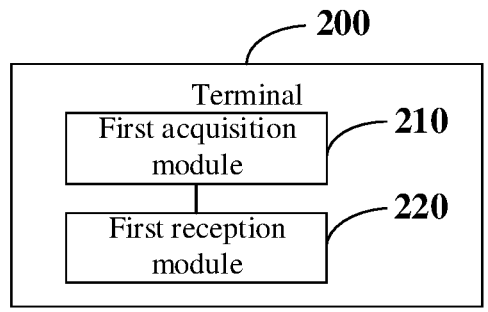
FIG. 2 is a schematic modular structure diagram of a terminal according to an embodiment of the present disclosure.

As shown in FIG. 2, a terminal 200 according to an embodiment of the present disclosure can implement the details of the method of acquiring target transmission configuration indicator (TCI) state information of a control resource set with an identity value of 0 (CORESET0) and receiving a physical downlink channel according to the target TCI state information when a preset condition is met according the foregoing embodiment, and achieve the same effects. The physical downlink channel includes at least one of: a physical downlink control channel (PDCCH) and a physical downlink shared channel (PDSCH). The terminal 200 specifically includes the following functional modules: a first acquisition module 210, used to acquire target transmission configuration indicator (TCI) state information of a control resource set with an identity value of 0 (CORESET0); a first reception module 220, used to receive a physical downlink channel according to the target TCI state information when a preset condition is met; wherein the physical downlink channel includes at least one of: a physical downlink control channel (PDCCH) and a physical downlink shared channel (PDSCH).

The first reception module 220 includes: a first determination submodule, used to determine that the physical downlink channel is quasi co-located (QCL) with the CORESET0 when the preset condition is met; a first reception submodule, used to receive the physical downlink channel according to the target TCI state information when the physical downlink channel is quasi co-located with the CORESET0.

The preset condition includes at least one of: that it is pre-defined that the physical downlink channel is QCL with the CORESET0; that configuration information of at least two TCI states corresponding to the physical downlink channel is received, and activation information for the at least two TCI states is not received. The configuration information of at least two TCI states corresponding to the physical downlink channel is received, and activation information for the at least two TCI states is not received includes: configuration information of at least two TCI states configured for the physical downlink channel for a first time is received, and activation information for the at least two TCI states is not received; or configuration information of at least two TCI states re-configured for the physical downlink channel is received, and activation information for the at least two TCI states is not received.

The terminal 200 further includes: a second reception module, used to receive the physical downlink channel according to a last activated TCI state when the configuration information of the at least two TCI states re-configured for the physical downlink channel is received, and the activation information for the at least two TCI states is not received.

The first acquisition module 210 includes: a first acquisition submodule, used to acquire the target TCI state information of the CORESET0 through radio resource control (RRC) signaling other than that transmitting a master system information block (MIB); wherein the RRC signaling includes: a first parameter field indicating the identity value of the CORESET0, and a second parameter field indicating a TCI state corresponding to the CORESET0.

The RRC signaling further includes other parameter field used for indicating other parameter of the CORESET0, and the other parameter indicated by the other parameter field is the same as a parameter indicated by the MIB for the CORESET0.

The acquisition submodule includes: a detection unit, used to detect the RRC signaling other than that transmitting the MIB; a determination unit, used to determine the target TCI state information of the CORESET0 according to the first parameter field and the second parameter field; and a processing module, used to ignore the other parameter field in the RRC signaling.

The first acquisition module further includes: a second reception submodule, used to, when the second parameter field indicates at least two TCI states, receive, through a medium access control (MAC) control element (CE), activation information used for activating a TCI state of the CORESET0; a second determination submodule, used to determine the target TCI state information from the at least two TCI states according to the activation information.

A reference signal of the TCI state indicated by the second parameter field is a synchronization signal and PBCH block (SSB), wherein when the second parameter field indicates at least two TCI states, SSBs corresponding to different TCI states have different index numbers.

The first acquisition module 210 further includes: a calculating submodule, used to calculate, according to a received synchronization signal and PBCH block (SSB), a reception quality of the SSB; a third determination submodule, used to, when the reception quality of the SSB is better than a reception quality of a target SSB corresponding to the CORESET0, determine that a CORESET corresponding to the SSB is a new CORESET0; a second acquisition submodule, used to acquire the target TCI state information of the new CORESET0.

The SSB is an SSB of a serving cell, or an SSB of a target cell.

It is noted, a network device and a terminal according to embodiments of the present disclosure may perform physical downlink channel transmission according to TCI state information of the CORESET0 when a preset condition is met. Thus, the flexibility of physical downlink channel transmission may be improved, thereby improving system performance.

Figure 3:
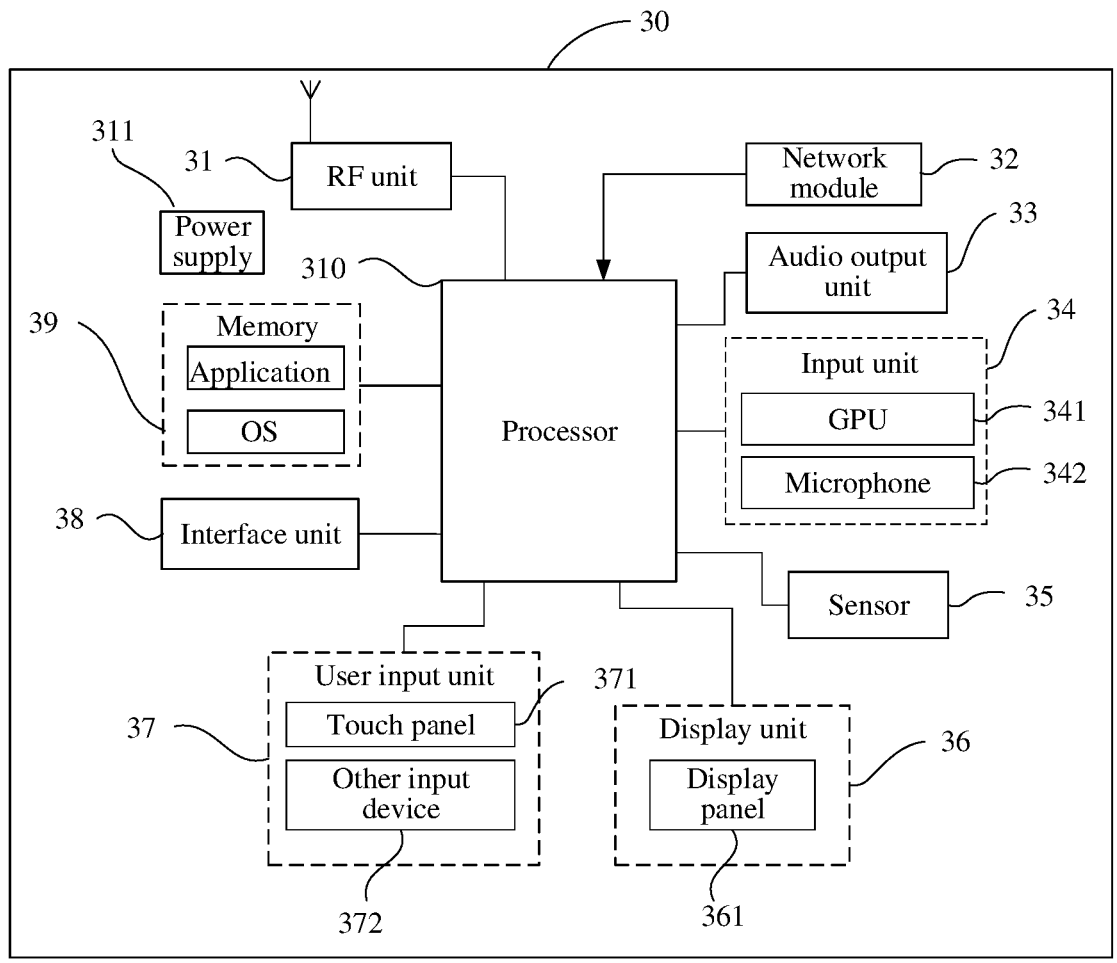
FIG. 3 is a block diagram of a terminal according to an embodiment of the present disclosure.

To better achieve the above object, further, FIG. 3 is a schematic hardware structure diagram of a terminal implementing various embodiments of the present disclosure. The terminal 30 includes, but is not limited to: a radio frequency (Radio Frequency, RF) unit 31, a network module 32, an audio output unit 33, an input unit 34, a sensor 35, a display unit 36, a user input unit 37, an interface unit 38, a memory 39, a processor 310, a power supply 311 and the like. It is appreciated by a person skilled in the art, the terminal structure as shown in FIG. 3 does not constitute a limitation on the terminal. The terminal may include more or less components than those as shown, or some components may be combined, or the components may have a different layout. In embodiments of the present disclosure, the terminal includes, but is not limited to: a mobile phone, a tablet computer, a notebook computer, a palmtop computer, an in-vehicle terminal, a wearable device, a pedometer and the like.

The RF unit 31 is used to perform the following steps under the control of the processor 310: acquiring target transmission configuration indicator (TCI) state information of a control resource set with an identity value of 0 (CORESET0); receiving a physical downlink channel according to the target TCI state information when a preset condition is met; wherein the physical downlink channel includes at least one of: a physical downlink control channel (PDCCH) and a physical downlink shared channel (PDSCH).

A network device and a terminal according to embodiments of the present disclosure may perform physical downlink channel transmission according to TCI state information of the CORESET0 when a preset condition is met. Thus, the flexibility of physical downlink channel transmission may be improved, thereby improving system performance.

It is understood, in embodiments of the present disclosure, the RF unit 31 may be used to receive and transmit signals during information transmission or during a call. Specifically, the RF unit 31 receives downlink data from a base station and transfers the data to the processor 310 for processing; and the RF unit 31 transmits uplink data to the base station. Generally, the RF unit 31 includes, but is not limited to: an antenna, at least one amplifier, a transceiver, a coupler, a low noise amplifier, a duplexer and the like. In addition, the RF unit 31 may communicate with a network and other device through a wireless communication system.

By means of the network module 32, the terminal provides user with wireless broadband Internet access, e.g., assists user in sending and receiving emails, browsing webpages and accessing streamed media.

The audio output unit 33 may convert audio data received by the RF unit 31 or network module 32 or stored in the memory 39 into audio signals and output audibly. Moreover, the audio output unit 33 may provide audio outputs associated with the specific functions performed by the terminal 30 (such as, incoming call ringtone, message received ringtone). The audio output unit 33 includes a speaker, a buzzer, a telephone receiver and the like.

The input unit 34 is used to receive audio or video signals. The input unit 34 may include a graphics processing unit (Graphics Processing Unit, GPU) 341 and a microphone 342. The GPU 341 processes image data such as still picture or video acquired by an image capture device (e.g., a camera) in a video capture mode or image capture mode. The processed image frames may be displayed on the display unit 36. The image frames processed by the GPU 341 may be stored in the memory 39 (or other storage medium) or sent via the RF unit 31 or network module 32. The microphone 342 may pick up sound and convert it into audio data. In a phone call mode, the processed audio data may be converted into a format suitable for transmission to a mobile communication base station via the RF unit 31 and output.

The terminal 30 further includes at least one sensor 35, for example, an optical sensor, a motion sensor, among others. In specific, the optical sensor includes ambient light sensor and proximity sensor. The ambient light sensor may adjust a brightness of a display panel 361 according to the ambient light conditions. The proximity sensor may deactivate the display panel 361 and/or a backlight when the terminal 30 is moved close to an ear. As a kind of motion sensor, an acceleration sensor may detect a magnitude of acceleration on each direction (generally, on three axes). While remaining still, the acceleration sensor may detect the magnitude and direction of gravity, which may be used in posture identification of the terminal (e.g., switch between portrait and landscape modes, related games, magnetometer posture calibration), vibration identification related function (e.g., pedometer, knock) and the like; the sensor 35 may further include a fingerprint sensor, a pressure sensor, an iris sensor, a molecule sensor, a gyroscope, a barometer, a hygrometer, a thermometer, an infrared sensor and the like, which is not described in detail herein.

The display unit 36 is used to display information input by or presented to a user. The display unit 36 may include a display panel 361. The display panel 361 may be constructed in form of liquid crystal display (Liquid Crystal Display, LCD), organic light-emitting diode (Organic Light-Emitting Diode, OLED) and the like.

The user input unit 37 may be used to receive input numerical information or character information, and generate key signal inputs related to the user setting and function control of the terminal. In specific, the user input unit 37 includes a touch panel 371 and other input device 372. The touch panel 371, also known as touch screen, may detect the touches thereon or in the vicinity thereof performed by the user (such as touch operations performed on or in the vicinity of the touch panel 371 by the user using a finger, stylus or any other suitable object or accessory). The touch panel 371 may include a touch detector and a touch controller. The touch detector detects the position where the user touched and the signal resulting from the touch operation, and conveys the signal to the touch controller; the touch controller receives the touch information from the touch detector, converts the information into coordinates of the touch and conveys the coordinates to the processor 310, as well as receives and executes the commands from the processor 310. Further, the touch panel 371 may be implemented in a variety of modes, such as resistance, capacitance, infrared and surface acoustic wave. In addition to the touch panel 371, the user input unit 37 may include other input devices 372. In specific, the other input devices 372 may include, but is not limited to: physical keyboard, functional keys (such as volume button, switch button, etc.), track ball, mouse, joystick, which is not described in detail herein.

Further, the touch panel 371 may overlie the display panel 361. Having detected a touch operation thereon or in the vicinity thereof, the touch panel 371 conveys the detected touch signal to the processor 310 to categorize the touch event, and the processor 310 provides corresponding visual output on the display panel 361 in accordance with the category of the touch event. Although, in FIG. 3, the touch panel 371 and the display panel 361 are provided as two separate parts to implement the input and output function of the terminal, the touch panel 371 and the display panel 361 may be integrated to implement the input and output function of the terminal in some embodiments, which is not limited herein.

The interface unit 38 is an interface by which an external device is connected to the terminal 30. For example, the external device may include a wired or wireless headset port, an external power supply (or battery charger) port, a wired or wireless data port, a storage card port, a port used to be connected to a device having an identification module, an audio input/output (I/O) port, a video I/O port, an earphone port and the like. The interface unit 38 may be used to receive input (e.g., data information, power, etc.) from the external device and transfer the received input to one or more components in the terminal 30, or may be used to transmit data between the terminal 30 and the external device.

The memory 39 may be used to store software program and various data. The memory 39 may include generally a program storage area and a data storage area. The program storage area may store an operating system (Operating System, OS), an application required for at least one function (such as an audio playing function and an image playback function) and the like; the data storage area may store data (e.g., audio data, phone book, etc.) created according to usage of a mobile phone, and the like. Moreover, the memory 39 may include a high-speed random access memory, as well as a non-volatile storage, such as at least one disk storage device, flash memory or other non-volatile solid-state storage devices.

The processor 310 is a control center of the terminal. The processor 310 is connected to various parts of the entire terminal through various interfaces and lines, and performs various functions of the terminal and processes data by executing or running software programs and/or modules stored in the memory 39 and invoking data stored in the memory 39, so as to achieve an overall monitoring of the terminal. The processor 310 may include one or more processing units; preferably, the processor 310 may integrate an application processor and a modem, wherein the application processor is mainly responsible for executing an operating system, a user interface, an application, etc., while the modem is mainly responsible for handling wireless communication. It is understood, the modem may be not integrated in the processor 310 alternatively.

The terminal 30 may further include a power supply 311 (e.g., a battery) providing power to various components. Preferably, the power supply 311 may be logically connected to the processor 310 via a power management system, such that functions such as charging management, discharging management and power management may be achieved through the power management system.

Further, the terminal 30 includes some functional modules not shown in the figure, which are not described herein.

Preferably, an embodiment of the present disclosure further provides a terminal. The terminal includes a processor 310, a memory 39, and a computer program stored in the memory 39 and used to be executed by the processor 310, wherein the processor 310 is used to execute the computer program to implement various processes of the foregoing channel transmission method, and may achieve the same technical effects. To avoid repetition, a detailed description is omitted herein. The terminal may be a wireless terminal or a wired terminal. The wireless terminal may refer to a device that provides a user with voice and/or other service data connectivity, a handheld device having a wireless connection function, or another processing device connected to a wireless modem. The wireless terminal may communicate with one or more core networks through a radio access network (Radio Access Network, RAN). The wireless terminal may be a mobile terminal, for example, a mobile phone (or referred to as a "cellular" phone) or a computer equipped with a mobile terminal, and may be a portable, pocket-sized, handheld, computer built-in or in-vehicle mobile apparatus, which exchanges voice and/or data with the RAN. For example, the wireless terminal may be a device such as a personal communication service (Personal Communication Service, PCS) phone, a cordless phone, a session initiation protocol (Session Initiation Protocol, SIP) phone, a wireless local loop (Wireless Local Loop, WLL) station or a personal digital assistant (Personal Digital Assistant, PDA). The wireless terminal may also be referred to as a system, a subscriber unit, a subscriber station, a mobile station, a mobile, a remote station, a remote terminal, an access terminal, a user terminal, a user agent, a user device or user equipment, which is not limited herein.

An embodiment of the present disclosure further provides a computer readable storage medium storing therein a computer program, wherein the computer program is used to be executed by a processor to implement various processes of the foregoing channel transmission method, and may achieve the same technical effects. To avoid repetition, a detailed description is omitted herein. The computer readable storage medium is for example a read-only memory (Read-Only Memory, ROM), a random access memory (Random Access Memory, RAM), a magnetic disk, an optical disc, or the like.

The foregoing embodiments describe the channel transmission method of the present disclosure from the terminal side. The following embodiment will further describe a channel transmission method on the network device side with reference to accompanying drawings.

Figure 4:
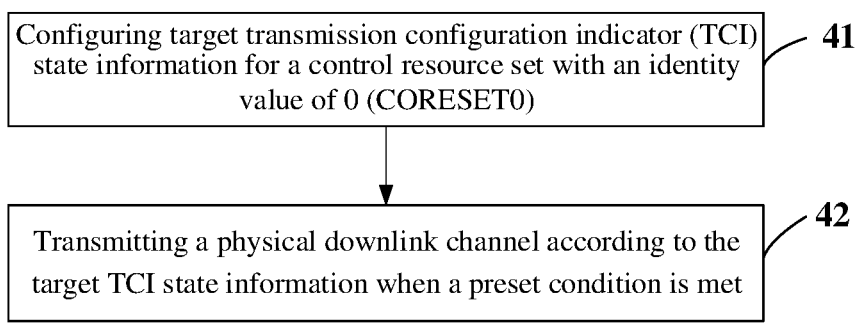
FIG. 4 is a schematic flow diagram of a channel transmission method on a network device side according to an embodiment of the present disclosure.

As shown in FIG. 4, a channel transmission method according to an embodiment of the present disclosure is operable by a network device side and may include the following steps.

A step 41: configuring target transmission configuration indicator (TCI) state information for a control resource set with an identity value of 0 (CORESET0).

The CORESET0 may be configured according to master system information block (Master System Information Block, MIB) information carried in an SSB and Serving Cell Config Common information. For example, information such as a frequency domain length of the CORESET0, a frequency domain position of the CORESET0 relative to the SSB, a time domain length of the CORESET0, a position of the first time domain symbol and other information may be configured through MIB and Serving Cell Config Common information.

A step 42: transmitting a physical downlink channel according to the target TCI state information when a preset condition is met.

The physical downlink channel includes at least one of: a physical downlink control channel (PDCCH) and a physical downlink shared channel (PDSCH).

Preferably, the step 42 may include: determining that the physical downlink channel is quasi co-located (QCL) with the CORESET0 when the preset condition is met; transmitting the physical downlink channel according to the target TCI state information when the physical downlink channel is quasi co-located with the CORESET0. When the preset condition is met, it is determined that the physical downlink channel is quasi co-located (QCL) with the CORESET0. Here, the quasi co-location relationship between the physical downlink channel and the CORESET0 may also be referred to as a default quasi co-location relationship. The preset condition refers to a condition satisfying the default quasi co-location relationship, and the preset condition may be pre-defined, or may be configured by a network device.

Preferably, the preset condition may include, but is not limited to, at least one of following conditions.

A condition: it is pre-defined that the physical downlink channel is QCL with the CORESET0. That is, it is pre-defined that there is a QCL relationship between the physical downlink channel and the CORESET0.

Another condition: configuration information of at least two TCI states corresponding to the physical downlink channel is transmitted, but activation information for the at least two TCI states is not transmitted. For example, the network device configures through a higher layer CORESET configuration which carries information of more than one TCI state, and before one of the TCI states is activated by an MAC CE, the network device assumes that, during the transmission of a physical downlink channel in the CORESET, there is a QCL relationship between the DMRS port for the physical downlink channel and the CORESET0. It is noted, for a PDCCH, when the configuration information indicates the only one TCI state corresponding to the PDCCH, the network device may transmit the PDCCH using the TCI state directly without using the default QCL relationship. For a PDSCH, when the configuration information indicates the only one TCI state corresponding to the PDSCH, the network device needs to transmit activation information to the terminal, if no activation information for the TCI state is transmitted, the PDSCH transmission can be performed only through the TCI state of the CORESET0 by using the default QCL relationship.

Further, that configuration information of at least two TCI states corresponding to the physical downlink channel is transmitted, but activation information for the at least two TCI states is not transmitted includes: that configuration information of at least two TCI states configured for the physical downlink channel for a first time is transmitted, but activation information for the at least two TCI states is not transmitted, wherein this scenario corresponds to the first scenario of the terminal side embodiment, thus a detailed description is omitted herein; or that configuration information of at least two TCI states re-configured for the physical downlink channel is transmitted, but activation information for the at least two TCI states is not transmitted, wherein this scenario corresponds to the second scenario of the terminal side embodiment, thus a detailed description is omitted herein.

In another embodiment, when configuration information of at least two TCI states re-configured for the physical downlink channel is transmitted, but activation information for the at least two TCI states is not transmitted, the network device transmits the physical downlink channel according to a last activated TCI state. Taking a PDSCH for example, after the network device transmits TCI state configuration information re-configured by the higher layer, and before the network device transmits an MAC CE for activating multiple corresponding TCI states, the network device uses directly a TCI state being activated (valid) before the re-configuration.

Apart from configuring the CORESET0 through MIB and Serving Cell Config Common, the network device may configure the target TCI state information of the CORESET0 in the following manner: configuring the target TCI state information of the CORESET0 through radio resource control (RRC) signaling other than that transmitting a master system information block (MIB); wherein the RRC signaling includes: a first parameter field indicating the identity value of the CORESET0, and a second parameter field indicating a TCI state corresponding to the CORESET0. The manner lies in that the system allows the network device to configure the TCI state of the CORESET0 and indicate the configured TCI state to the terminal through RRC signaling other than MIB information after the initial access. Specifically, after the initial access, the network device indicates the TCI state information of the CORESET0 to the terminal through RRC signaling other than the MIB information. Preferably, a configuration method may include: configuring the TCI state information of the CORESET0 through a rule of limiting parameter in the higher layer signaling parameter CORESET field. The RRC signaling further includes other parameter field used for indicating other parameter of the CORESET0, and the other parameter indicated by the other parameter field is the same as a parameter indicated by the MIB for the CORESET0. The rule of limiting parameter is the same as that in the terminal side embodiment, thus a detailed description is omitted herein.

A reference signal of the TCI state indicated by the second parameter field is a synchronization signal and PBCH block (SSB), wherein when the second parameter field indicates at least two TCI states, SSBs corresponding to different TCI states have different index numbers. In other words, when control Resource SetId has a value of 0, the reference signal in the indicated TCI states is SSB only, i.e., there is only a QCL relationship between the CORESET0 and SSB, and multiple TCI states differ from each other only in SSB index.

Further, when the second parameter field indicates at least two TCI states, after the configuring the target TCI state information of the CORESET0, the method further includes: transmitting activation information used for indicating target TCI state information of the CORESET0 to a terminal through a medium access control (MAC) control element (CE). In other words, when the information of TCI states includes multiple values, activation is performed according to the normal rule of activating TCI state through MAC CE.

On the basis of the above, in the channel transmission method according to the embodiments of the present disclosure, a network device and a terminal may perform physical downlink channel transmission according to TCI state information of the CORESET0 when a preset condition is met. Thus, the flexibility of physical downlink channel transmission may be improved, thereby improving system performance.

The foregoing embodiments describe in detail a channel transmission method in different scenarios. The network device corresponding to the method is further described in the following embodiment with reference to the accompany drawings.

Figure 5:
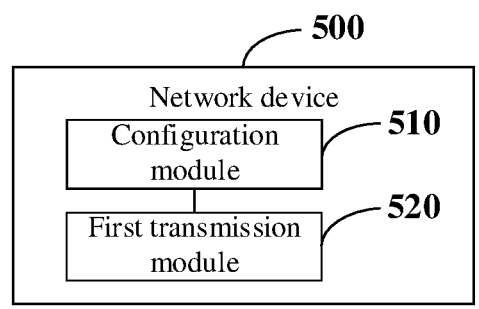
FIG. 5 is a schematic modular structure diagram of a network device according to an embodiment of the present disclosure.

As shown in FIG. 5, a network device 500 according to an embodiment of the present disclosure can implement the details of the method of configuring target transmission configuration indicator (TCI) state information for a control resource set with an identity value of 0 (CORESET0) and transmitting a physical downlink channel according to the target TCI state information when a preset condition is met according the foregoing embodiment, and achieve the same effects. The physical downlink channel includes at least one of: a physical downlink control channel (PDCCH) and a physical downlink shared channel (PDSCH). The terminal 500 specifically includes the following functional modules: a configuration module 510, used to configure target transmission configuration indicator (TCI) state information for a control resource set with an identity value of 0 (CORESET0); a first transmission module 520, used to transmit a physical downlink channel according to the target TCI state information when a preset condition is met; wherein the physical downlink channel includes at least one of: a physical downlink control channel (PDCCH) and a physical downlink shared channel (PDSCH).

The first transmission module 520 includes: a determination submodule, used to determine that the physical downlink channel is quasi co-located (QCL) with the CORESET0 when the preset condition is met; a first transmission submodule, used to transmit the physical downlink channel according to the target TCI state information when the physical downlink channel is quasi co-located with the CORESET0.

The preset condition includes at least one of following conditions: that it is pre-defined that the physical downlink channel is QCL with the CORESET0; that configuration information of at least two TCI states corresponding to the physical downlink channel is transmitted, but activation information for the at least two TCI states is not transmitted.

That configuration information of at least two TCI states corresponding to the physical downlink channel is transmitted, but activation information for the at least two TCI states is not transmitted includes: that configuration information of at least two TCI states configured for the physical downlink channel for a first time is transmitted, but activation information for the at least two TCI states is not transmitted; or configuration information of at least two TCI states re-configured for the physical downlink channel is transmitted, but activation information for the at least two TCI states is not transmitted.

The network device 500 further includes: a second transmission module, used to transmit the physical downlink channel according to a last activated TCI state when the configuration information of the at least two TCI states re-configured for the physical downlink channel is transmitted, but the activation information for the at least two TCI states is not transmitted.

The configuration module 510 includes: a first configuration submodule, used to configure the target TCI state information of the CORESET0 through radio resource control (RRC) signaling other than that transmitting a master system information block (MIB); wherein the RRC signaling includes: a first parameter field indicating the identity value of the CORESET0, and a second parameter field indicating a TCI state corresponding to the CORESET0.

The RRC signaling further includes other parameter field used for indicating other parameter of the CORESET0, and the other parameter indicated by the other parameter field is the same as a parameter indicated by the MIB for the CORESET0.

The network device 500 further includes: a third transmission module, used to transmit activation information used for indicating target TCI state information of the CORESET0 to a terminal through a medium access control (MAC) control element (CE).

A reference signal of the TCI state indicated by the second parameter field is a synchronization signal and PBCH block (SSB), wherein when the second parameter field indicates at least two TCI states, SSBs corresponding to different TCI states have different index numbers.

It should be noted, it is understood that the division of various modules of the foregoing network device and terminal is merely a logical function division. In practice, the modules may be entirely or partly integrated onto a physical entity, or may be separated physically. These modules may be implemented entirely in form of software used to be invoked by a processing element, or implemented entirely in form of hardware, or implemented with some modules being in form of software used to be invoked by a processing element and some modules being in form of hardware. For example, the determination module may be a standalone processing element, or may be implemented by being integrated in a certain chip of the foregoing device, or may be stored in form of program codes in the memory of the foregoing device and invoked by a certain processing element of the foregoing device to perform the function of foregoing determination module. The implementations of other modules are similar to the determination module. Further, these modules may be entirely or partly integrated together, or may be implemented independently. The processing element described here may be a type of integrated circuit with signal processing capability. In the implementation process, the various steps of the foregoing method or the various modules may be achieved through the hardware integrated logical circuits in the processor element or instructions in software form.

For example, the foregoing modules may be one or more integrated circuits used to implement the foregoing method, for example: one or more application specific integrated circuits (Application Specific Integrated Circuits, ASICs), one or more digital signal processors (Digital Signal Processors, DSPs), one or more field programmable gate arrays (Field Programmable Gate Arrays, FPGAs), or the like. For another example, when a certain module is implemented in form of a program code used to be invoked by a processing element, the processing element may be a general-purpose processor, e.g., a central processing unit (Central Processing Unit, CPU), or other processor capable of invoking program codes. For another example, these modules may integrated together and implemented in form of a system-on-a-chip (System-On-a-Chip, SOC).

It is noted, a network device and a terminal according to embodiments of the present disclosure may perform physical downlink channel transmission according to TCI state information of the CORESET0 when a preset condition is met. Thus, the flexibility of physical downlink channel transmission may be improved, thereby improving system performance.

To better achieve the above object, an embodiment of the present disclosure further provides a network device. The network device includes a processor, a memory, and a computer program stored in the memory and used to be executed by the processor, wherein the processor is used to execute the computer program to implement steps of the foregoing channel transmission method. An embodiment of the present disclosure further provides a computer readable storage medium storing therein a computer program, wherein the computer program is used to be executed by a processor to implement steps of the foregoing channel transmission method.

Figure 6:
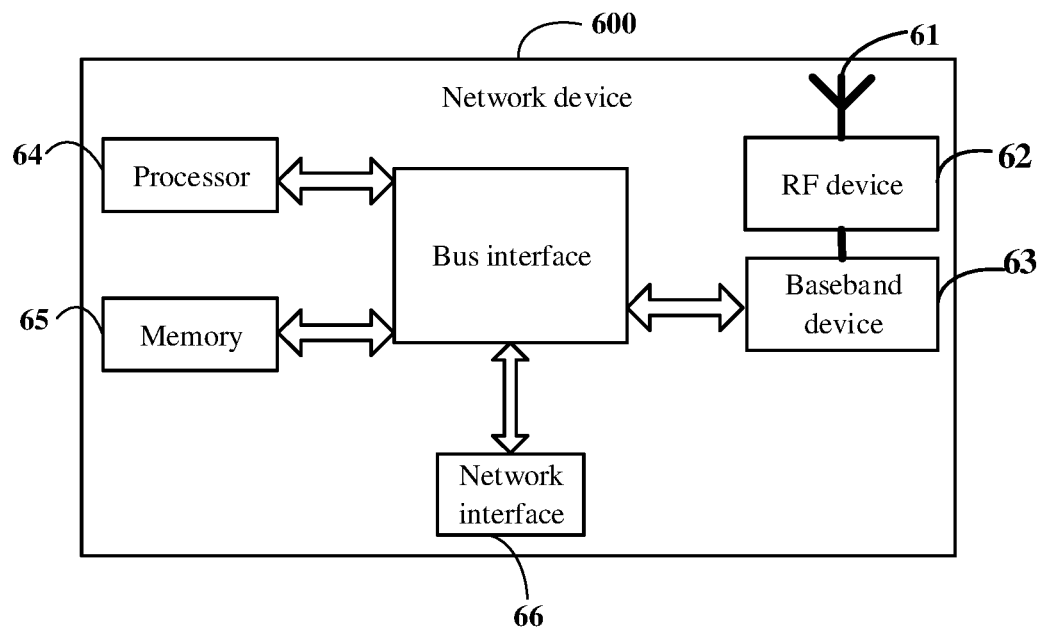
FIG. 6 is a block diagram of a network device according to an embodiment of the present disclosure.

Specifically, an embodiment of the present disclosure further provides a network device. As shown in FIG. 6, the network device 600 includes: an antenna 61, an RF device 62, and a baseband device 63. The antenna 61 is connected to the RF device 62. In an uplink direction, the RF device 62 receives information through the antenna 61, and transmits the received information to the baseband device 63 for processing. In a downlink direction, the baseband device 63 processes information to be transmitted, and transmits the information to the RF device 62. The RF device 62 processes the received information and transmits the processed information via the antenna 61.

The foregoing frequency band processing device may be located in the baseband device 63. The method performed by the network device in the foregoing embodiments may be implemented in the baseband device 63. The baseband device 63 includes a processor 64 and a memory 65.

The baseband device 63 may include, for example, at least one baseband board. A plurality of chips are disposed on the baseband board. As shown in FIG. 6, one of the chips is, for example, the processor 64, and the processor 64 is connected to the memory 65, to invoke a program in the memory 65, to perform the operations of the network device as described in the foregoing method embodiments.

The baseband device 63 may further include a network interface 66, used to exchange information with the RF device 62. The interface is, for example, a common public radio interface (Common Public Radio Interface, CPRI).

The processor herein may be one processor or refer to multiple processing elements collectively. For example, the processor may be a CPU, or may be an ASIC, or one or more integrated circuits used to implement the method performed by the network device, such as one or more digital signal processors (DSP), or one or more field programmable gate arrays (FPGA). The storage element may be one storage or may refer to multiple storage elements collectively.

The memory 65 may be a volatile memory or non-volatile memory or may include both volatile memory and non-volatile memory. The non-volatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM) or a flash memory. The volatile memory may be a random access memory (Random Access Memory, RAM) and is used as an external cache. By way of example and without any limitation, various forms of RAMs are usable, such as a static RAM (Static RAM, SRAM), a dynamic RAM (Dynamic RAM, DRAM), a synchronous DRAM (Synchronous DRAM, SDRAM), a double data rate SDRAM (Double Data Rate SDRAM, DDRSDRAM), an enhanced SDRAM (Enhanced SDRAM, ESDRAM), an synchlink DRAM (Synchlink DRAM, SLDRAM), and a direct Rambus RAM (Direct Rambus RAM, DRRAM). The memory 65 described in this application is intended to include, but not limited to, these and any other suitable types of memory.

Specifically, the network device according to an embodiment of the present disclosure may further include a computer program stored in the memory 65 and used to be executed by the processor 64, wherein the processor 64 is used to invoke the computer program in the memory 65 to implement the method implemented by various modules as shown in FIG. 5.

Specifically, the processor 64 is used to invoke the computer program to implement the following steps: configuring target transmission configuration indicator (TCI) state information for a control resource set with an identity value of 0 (CORESET0); transmitting a physical downlink channel according to the target TCI state information when a preset condition is met; wherein the physical downlink channel includes at least one of: a physical downlink control channel (PDCCH) and a physical downlink shared channel (PDSCH).

Specifically, the processor 64 is used to invoke the computer program to implement the following steps: determining that the physical downlink channel is quasi co-located (QCL) with the CORESET0 when the preset condition is met; transmitting the physical downlink channel according to the target TCI state information when the physical downlink channel is quasi co-located with the CORESET0.

The preset condition includes at least one of: that it is pre-defined that the physical downlink channel is QCL with the CORESET0; that configuration information of at least two TCI states corresponding to the physical downlink channel is transmitted, but activation information for the at least two TCI states is not transmitted.

That configuration information of at least two TCI states corresponding to the physical downlink channel is transmitted, but activation information for the at least two TCI states is not transmitted includes: configuration information of at least two TCI states configured for the physical downlink channel for a first time is transmitted, but activation information for the at least two TCI states is not transmitted; or configuration information of at least two TCI states re-configured for the physical downlink channel is transmitted, but activation information for the at least two TCI states is not transmitted.

Specifically, the processor 64 is used to invoke the computer program to implement the following step: transmitting the physical downlink channel according to a last activated TCI state when the configuration information of the at least two TCI states re-configured for the physical downlink channel is transmitted, but the activation information for the at least two TCI states is not transmitted.

Specifically, the processor 64 is used to invoke the computer program to implement the following step: configuring the target TCI state information of the CORESET0 through radio resource control (RRC) signaling other than that transmitting a master system information block (MIB); wherein the RRC signaling includes: a first parameter field indicating the identity value of the CORESET0, and a second parameter field indicating a TCI state corresponding to the CORESET0.

The RRC signaling further includes other parameter field used for indicating other parameter of the CORESET0, and the other parameter indicated by the other parameter field is the same as a parameter indicated by the MIB for the CORESET0.

Specifically, the processor 64 is used to invoke the computer program to implement the following step: transmitting activation information used for indicating target TCI state information of the CORESET0 to a terminal through a medium access control (MAC) control element (CE).

A reference signal of the TCI state indicated by the second parameter field is a synchronization signal and PBCH block (SSB), wherein when the second parameter field indicates at least two TCI states, SSBs corresponding to different TCI states have different index numbers.

The network device may be a base transceiver station (Base Transceiver Station, BTS) in the global system of mobile communication (Global System of Mobile communication, GSM) or the code division multiple access (Code Division Multiple Access, CDMA), a nodeB (NodeB, NB) in the wideband code division multiple access (Wideband Code Division Multiple Access, WCDMA), an evolutional node B (Evolutional Node B, eNB or eNodeB) in LTE, a relay station or an access point, or a base station in future 5G network, or the like, which is not limited herein.

A network device and a terminal according to embodiments of the present disclosure may perform physical downlink channel transmission according to TCI state information of the CORESET0 when a preset condition is met. Thus, the flexibility of physical downlink channel transmission may be improved, thereby improving system performance.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation extends beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium, and includes instructions for instructing a computer device (which may be, e.g., a personal computer, a server, or a network device) to perform all or a part of the steps of the methods described in the embodiments of the disclosure. The foregoing storage medium includes any medium that can store program code, such as a universal serial bus flash drive, a removable hard disk, an ROM, an RAM, a magnetic disk, or an optical disc.

In addition, it should be noted that in the device and the method of the present disclosure, apparently, parts or steps may be divided and/or re-combined. The divisions and/or re-combinations should be regarded as equivalent solutions of the present disclosure. Moreover, steps of the above series of processes may be performed naturally in a time order of description. However, the performing sequence is not limited to the time order. Some steps may be performed in parallel or independently. A person skilled in the art would appreciate that all or any steps or parts of the methods and devices of the present disclosure may be implemented in any computing device (including a processor, a storage medium or the like) or a network of computing devices in hardware, firmware, software or a combination thereof, and this can be achieved by a person skilled in the art by using their basic programming skill after reading the description of the present disclosure.

Thus, the object of the present disclosure may also be implemented by running a program or a set of programs on any computing device. The computing device may be a known general purpose device. Thus, the object of the present disclosure may also be implemented merely by providing a program product which contains program code for implementing the methods or devices. That is, such program product also constitutes the present disclosure, and a storage medium in which such a program product is stored also constitutes the present disclosure. Apparently, the storage medium may be any known storage medium or any storage medium that will be developed in the future. It should also be noted that, in the devices and methods of the present disclosure, apparently, parts or steps may be divided and/or re-combined. The divisions and/or re-combinations should be regarded as equivalent solutions of the present disclosure. Moreover, steps of the foregoing series of processes may be performed naturally in a time order of description, however the performing sequence is not limited to the time order. Some steps may be performed in parallel or independently.

The foregoing describes preferred implementations of the present disclosure. It should be noted that for a person of ordinary skill in the art, improvements and modifications may further be made without departing from the principle of the present disclosure. These improvements and modifications should also be deemed as falling within the scope of the present disclosure.

What is claimed is:

1. A non-transitory computer readable storage medium storing therein a computer program, wherein the computer program is used to be executed by a processor to implement steps of:
   acquiring target transmission configuration indicator (TCI) state information of a control resource set with an identity value of 0 (CORESET0);
   receiving a physical downlink channel according to the target TCI state information when a preset condition is met, wherein the physical downlink channel comprises at least one of: a physical downlink control channel (PDCCH) and a physical downlink shared channel (PDSCH).

2. The non-transitory computer readable storage medium according to claim 1, wherein the receiving the physical downlink channel according to the target TCI state information when the preset condition is met comprises:
   determining that the physical downlink channel is quasi co-located (QCL) with the CORESET0 when the preset condition is met;
   receiving the physical downlink channel according to the target TCI state information when the physical downlink channel is QCL with the CORESET0.

3. The non-transitory computer readable storage medium according to claim 1, wherein the preset condition comprises at least one of:
   that it is pre-defined that the physical downlink channel is QCL with the CORESET0;
   that configuration information of at least two TCI states corresponding to the physical downlink channel is received, and activation information for the at least two TCI states is not received.

4. The non-transitory computer readable storage medium according to claim 3, wherein that the configuration information of at least two TCI states corresponding to the physical downlink channel is received, and the activation information for the at least two TCI states is not received comprises:
   that configuration information of at least two TCI states configured for the physical downlink channel for a first time is received, and activation information for the at least two TCI states is not received; or
   that configuration information of at least two TCI states re-configured for the physical downlink channel is received, and activation information for the at least two TCI states is not received.

5. The non-transitory computer readable storage medium according to claim 4, wherein the computer program is further used to be executed by the processor to implement a step of:
   receiving the physical downlink channel according to a last activated TCI state when the configuration information of the at least two TCI states re-configured for the physical downlink channel is received, and the activation information for the at least two TCI states is not received.

6. The non-transitory computer readable storage medium according to claim 1, wherein the acquiring the target transmission configuration indicator (TCI) state information of the control resource set with the identity value of 0 (CORESET0) comprises:
   acquiring the target TCI state information of the CORESET0 through radio resource control (RRC) signaling other than that carrying a master system information block (MIB), wherein the RRC signaling comprises: a first parameter field indicating the identity value of the CORESET0, and a second parameter field indicating a TCI state corresponding to the CORESET0.

7. The non-transitory computer readable storage medium according to claim 6, wherein the RRC signaling further comprises other parameter field used for indicating other parameter of the CORESET0, and the other parameter indicated by the other parameter field is the same as a parameter indicated by the MIB for the CORESET0.

8. The non-transitory computer readable storage medium according to claim 7, wherein the acquiring the target TCI state information of the CORESET0 through the radio resource control (RRC) signaling other than that transmitting the master system information block (MIB) comprises:
   detecting the RRC signaling other than that transmitting the MIB;

determining the target TCI state information of the CORESET0 according to the first parameter field and the second parameter field; and ignoring the other parameter field in the RRC signaling.

9. The non-transitory computer readable storage medium according to claim 6, wherein when the second parameter field indicates at least two TCI states, the acquiring the target TCI state information of the CORESET0 further comprises:

receiving, through a medium access control (MAC) control element (CE), activation information used for activating a TCI state of the CORESET0;

determining the target TCI state information from the at least two TCI states according to the activation information.

10. The non-transitory computer readable storage medium according to claim 6, wherein a reference signal of the TCI state indicated by the second parameter field is a synchronization signal and PBCH block (SSB), wherein the SSBs corresponding to different TCI states have different index numbers.

11. The non-transitory computer readable storage medium according to claim 1, wherein the acquiring the target transmission configuration indicator (TCI) state information of the control resource set with the identity value of 0 (CORESET0) comprises:

calculating, according to a received synchronization signal and PBCH block (SSB), a reception quality of the SSB;

determining that a CORESET corresponding to the SSB is a new CORESET0 when the reception quality of the SSB is better than a reception quality of a target SSB corresponding to the CORESET0;

acquiring the target TCI state information of the new CORESET0.

12. The non-transitory computer readable storage medium according to claim 11, wherein the SSB is an SSB of a serving cell, or an SSB of a target cell.

13. A non-transitory computer readable storage medium storing therein a computer program, wherein the computer program is used to be executed by a processor to implement steps of:

configuring target transmission configuration indicator (TCI) state information of a control resource set with an identity value of 0 (CORESET0);

transmitting a physical downlink channel according to the target TCI state information when a preset condition is met, wherein the physical downlink channel comprises at least one of: a physical downlink control channel (PDCCH) and a physical downlink shared channel (PDSCH).

14. The non-transitory computer readable storage medium according to claim 13, wherein the transmitting the physical downlink channel according to the target TCI state information when the preset condition is met comprises:

determining that the physical downlink channel is quasi co-located (QCL) with the CORESET0 when the preset condition is met;

transmitting the physical downlink channel according to the target TCI state information when the physical downlink channel is quasi co-located with the CORESET0.

15. The non-transitory computer readable storage medium according to claim 13, wherein the preset condition comprises at least one of:

that it is pre-defined that the physical downlink channel is QCL with the CORESET0;

that configuration information of at least two TCI states corresponding to the physical downlink channel is transmitted, but activation information for the at least two TCI states is not transmitted.

16. The non-transitory computer readable storage medium according to claim 15, wherein that the configuration information of at least two TCI states corresponding to the physical downlink channel is transmitted, but the activation information for the at least two TCI states is not transmitted comprises:

that configuration information of at least two TCI states configured for the physical downlink channel for a first time is transmitted, but activation information for the at least two TCI states is not transmitted; or that configuration information of at least two TCI states re-configured for the physical downlink channel is transmitted, but activation information for the at least two TCI states is not transmitted.

17. The non-transitory computer readable storage medium according to claim 16, wherein the computer program is further used to be executed by the processor to implement a step of:

transmitting the physical downlink channel according to a last activated TCI state when the configuration information of the at least two TCI states re-configured for the physical downlink channel is transmitted, but the activation information for the at least two TCI states is not transmitted.

18. The non-transitory computer readable storage medium according to claim 13, wherein the configuring the target transmission configuration indicator (TCI) state information of the control resource set with the identity value of 0 (CORESET0) comprises:

configuring the target TCI state information of the CORESET0 through radio resource control (RRC) signaling other than that carrying a master system information block (MIB), wherein the RRC signaling comprises: a first parameter field indicating the identity value of the CORESET0, and a second parameter field indicating a TCI state corresponding to the CORESET0.

19. The non-transitory computer readable storage medium according to claim 18, wherein the RRC signaling further comprises other parameter field used for indicating other parameter of the CORESET0, and the other parameter indicated by the other parameter field is the same as a parameter indicated by the MIB for the CORESET0.

20. The non-transitory computer readable storage medium according to claim 18, wherein after the configuring the target TCI state information of the CORESET0, the computer program is further used to be executed by the processor to implement a step of:

transmitting activation information used for indicating target TCI state information of the CORESET0 to a terminal through a medium access control (MAC) control element (CE).

* * * * *